F. F. ELLIS.
AUTOMATIC LUBRICATOR.
APPLICATION FILED FEB. 11, 1907.
956,694.
Patented May 3, 1910.
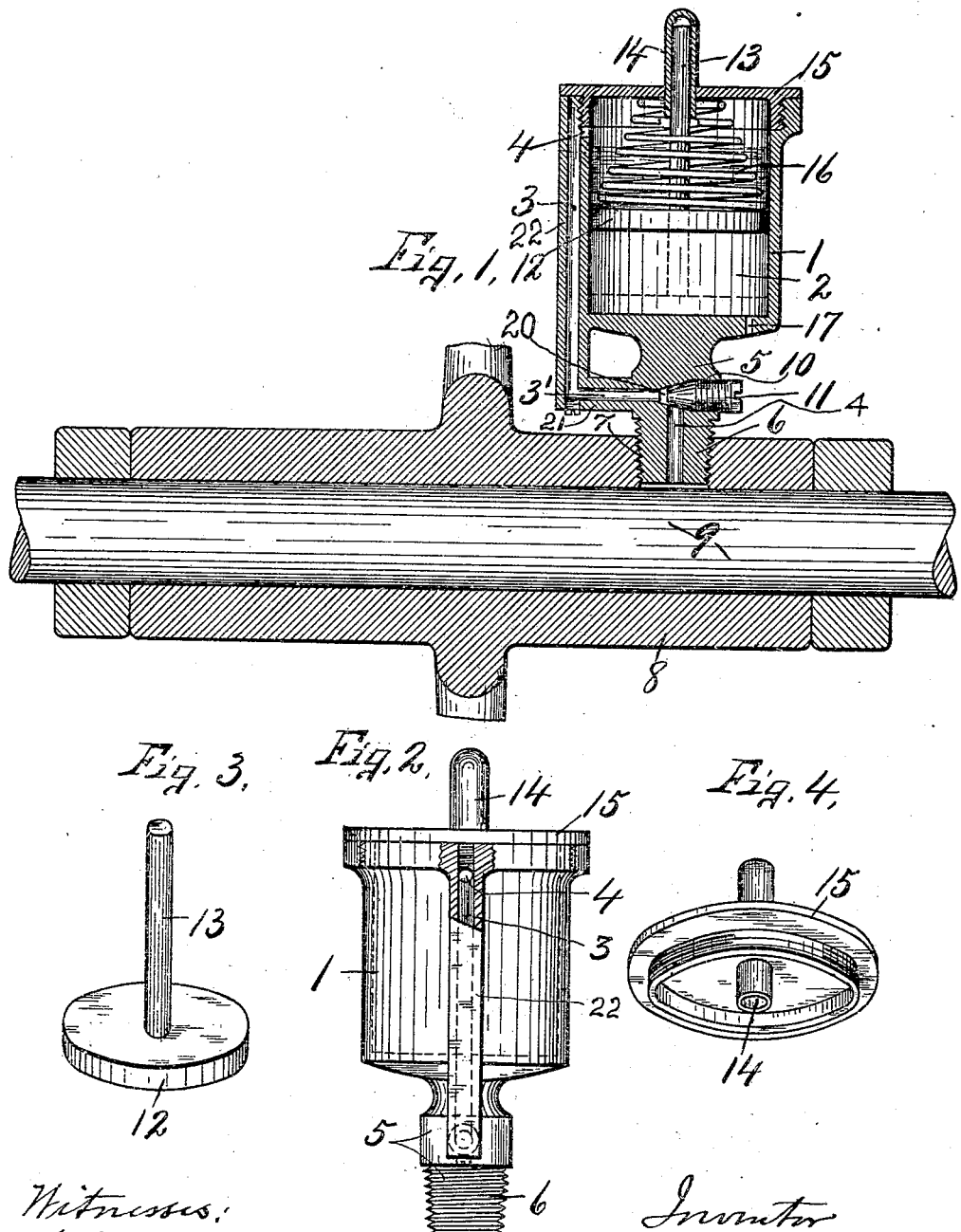
Witnesses:
Chas. H. Hughes
Inventor
F. F. Ellis
By Howard P. Denison
Atty.

UNITED STATES PATENT OFFICE.

FERRAND F. ELLIS, OF ONEIDA, NEW YORK.

AUTOMATIC LUBRICATOR.

956,694.

Specification of Letters Patent. Patented May 3, 1910.

Application filed February 11, 1907. Serial No. 356,866.

*To all whom it may concern:*

Be it known that I, FERRAND F. ELLIS, of Oneida, in the county of Madison, in the State of New York, have invented new and useful Improvements in Automatic Lubricators, of which the following, taken in connection with the accompanying drawings, is a full, clear, and exact description.

This invention relates to certain improvements in automatic lubricators for revolving elements such as loose pulleys to which is attached an oil cup communicating through a by-pass with the bearing for the revolving element and containing a movable piston acting under centrifugal force by the rotation of the revolving element to force the lubricant, as oil, through the by-pass to the bearing.

My object is to provide a loose pulley or similar revolving element with a simple, practical and efficient lubricating device which is automatic in its action and self-regulating to feed the lubricant in suitable quantities to the bearing according to the speed of revolution of said element.

Other objects and uses relating to the specific structure of the device will be brought out in the following description.

In the drawings,—Figure 1 is a sectional view of my improved lubricating device shown as operatively mounted upon the hub of a loose pulley. Fig. 2 is an elevation of the detached lubricating device showing the upper end of the by-pass in section, as communicating with the upper end of the cup. Fig. 3 is a detached view of the piston and Fig. 4 is a similar view of the detached cap of the oil cup.

In carrying out the objects stated I provide an oil cup —1— with an interior chamber —2— and an external extension 22 provided with a vertical passage or by-pass —3— which communicates at its outer end through a suitable aperture —4— with the interior of the cup and its inner end communicates with an axial passage —4'— centrally through the lower end of the shank as —5— of the cup. This shank —5— is provided with a threaded nipple —6— adapted to be screwed into a threaded opening —7— in the hub as —8— of a loose pulley or other revolving element adapted to be mounted upon a bearing as a shaft —9—.

The axial oil passage —4'— extends entirely through the nipple —6— to establish communication between the by-pass —3— and bearing —9— and is in this particular instance disposed at substantially right angles to an integral lateral offset 21 of the nipple. Said offset having the lateral passage 3' forming a continuation of the by-pass —3—.

The shank —5— or nipple —6— is provided with a radial threaded opening —10— contracting to form an intermediate opening 20, in alinement and communicating with the lateral offset —3'— of the by-pass —3— and in this threaded aperture —10— is fitted an adjustable screw threaded valve —11— adapted to be adjusted by a suitable tool, as a screw driver, across the outer end of the axial passage —4'— and toward and from the adjacent end of the lateral passage —3'— for the purpose of varying the size of the opening 20 between said passengers and thereby regulating the quantity of lubricant which may be admitted to the bearing at one time. In other words, this valve is for the purpose of regulating the flow of the lubricant according to its fluency and when once adjusted for a certain grade of oil, it may be left in such position and the feed of the lubricant automatically regulated by the centrifugal action of the piston as presently described. In order that this centrifugal feed of the lubricant may be effected, I provide a piston —12— of suitable material which is snugly fitted with an easy sliding action within the interior of the cup —1— and is provided with an outwardly projecting stem —13— having its outer end guided in a tubular guide —14— centrally in the cap as —15— of the cup.

A spring —16— in the form of a coil, is fitted over the tubular stem —13— with its inner end bearing against the outer face of the piston —12— and its outer end engaged with the inner face of the cap —15—, around the inwardly projecting end of the tubular guide —14—, for the purpose of normally retracting the piston and offering a slight degree of resistance to its centrifugal action sufficient to prevent excessive feed of the lubricant.

The bottom or inner end of the cup —1— is provided with a suitable vent opening —17— to allow the entrance and exit of air at the inner end of the piston and thereby prevent excessive vacuum or compression of the air which would interfere with the free action of the piston.

It is evident from the foregoing description that this lubricating device is particularly simple and effective and may be readily attached to any revolving element without special fitting, the only work necessary being to provide the hub of said revolving element with a threaded aperture into which the nipple —6— may be screwed.

When the device is placed in operative position in the manner just described and the pulley or the revolving member is rotated at a sufficient speed, the piston —12— will be thrown or moved outwardly by centrifugal force against the action of the spring —16—, thereby forcing the lubricant, which has been previously placed in the cup —1—, through the aperture —4— and thence through the external by-pass —3— and —3'— and passage —4'— to the bearing —9—, and it is obvious that the greater the speed of rotation, the greater will be the pressure exerted by the piston —12— due to centrifugal force to increase the feed of the lubricant to the bearing —9— thereby supplying the lubricant in quantities proportionate to the speed of rotation.

As soon as the pulley is brought to rest or its speed materially lowered the piston is retracted by the spring —16— which causes the cessation of the feed of the lubricant so that the latter is supplied to the bearing only when the revolving element is in action, thus producing a saving in the use of the lubricant, and at the same time the device is always ready for action to supply such lubricant in quantities proportionate to the demand.

What I claim is:

An automatic lubricator comprising a hollow cylindrical body portion provided at its bottom with an exteriorly arranged shank terminating in a threaded nipple having a vertical channel, and adapted to be secured to a rotatable element, said body portion having its wall formed with an extension, said extension provided with a vertical passage, there being a lateral offset formed integral with said shank and having a lateral passage therethrough, said lateral passage forming a continuation of said vertical passage, said body portion provided with a port for establishing communication between said vertical passage and the interior of the body portion, said shank having a lateral aperture therethrough and said lateral aperture communicating intermediate its ends with said vertical channel and forming the continuation of said lateral passage, said lateral aperture having its inner part gradually contracting, a valve extending into said lateral aperture and projecting within said contracted portion thereof at the point of communication between the lateral aperture and said vertical channel, a closure detachably secured to said body portion, a tubular guide member extending through said closure and having a closed outer end, a piston operating in said body portion and having a stem projecting into said guide, and a spring surrounding the inner portion of said guide member and engaging said piston.

In witness whereof I have hereunto set my hand this 6th day of February 1907.

FERRAND F. ELLIS.

Witnesses:
H. E. Chase,
M. M. Nott.